United States Patent

Tschoi

[11] Patent Number: 5,969,616
[45] Date of Patent: Oct. 19, 1999

[54] ANTI-DROWSING/ANTI-DOZING ALARM DEVICE

[76] Inventor: Jin Sook Tschoi, 51-60 Van Kleeck St., #6J, Elmhurst, N.Y. 11373

[21] Appl. No.: 09/075,209

[22] Filed: May 11, 1998

[51] Int. Cl.$^6$ ................................................... G08B 23/00
[52] U.S. Cl. ............................ 340/576; 180/272; 340/575
[58] Field of Search .................................. 340/575, 576; 180/272

[56] References Cited

U.S. PATENT DOCUMENTS

| | | | |
|---|---|---|---|
| 2,575,926 | 11/1951 | Murray | 340/576 X |
| 4,617,559 | 10/1986 | Slansky | 340/576 |
| 5,453,929 | 9/1995 | Stove | 340/575 X |
| 5,559,495 | 9/1996 | Cochran | 340/575 X |
| 5,585,785 | 12/1996 | Gwin et al. | 340/575 |

FOREIGN PATENT DOCUMENTS 2125998  3/1984  United Kingdom .................. 340/575

*Primary Examiner*—Thomas Mullen
*Attorney, Agent, or Firm*—Joseph H. McGlynn

[57] ABSTRACT

A driver alarm system for alerting the driver to conditions of fatigue and drowsiness. The alarm system has a power source, an on-off switch, signaling device, and a depressible control button. A flexible jacket for installation on the steering control of a vehicle which transmits pressure of the driver's grip to bear on the depressible control button to deactivate the signaling device. In one embodiment, the pressure transmitter is a pneumatic or hydraulic element inside the jacket. In another embodiment, the pressure transmitter is a spring-biased element. In still another embodiment, the pressure transmitting element comprises a center conductor surrounded by a compressible conductive element, providing variable resistance. Current is provided to an electromagnet when pressure on the jacket decreases resistance. The electromagnet biases a magnetic control button to activate and deactivate the signaling device in response to pressure on the jacket.

11 Claims, 2 Drawing Sheets

ANTI-DROWSING/ANTI-DOZING ALARM DEVICE

BACKGROUND OF THE INVENTION

The present invention relates generally to a safety system for automobile drivers, and in particular to an alarm system having capability to sense the onset of drowsiness or fatigue and to alert and awaken the driver.

DESCRIPTION OF THE PRIOR ART

It is known in the art of car safety devices to have alarm systems that alert the driver of the automobile to various safety hazards. In particular, it is known to have devices that awaken the driver when he or she becomes fatigued or drowsy.

By way of example, U.S. Pat. No. 5,559,495 discloses a sleep-preventing alarm that transmits a visual and audible alert according to an interval programmed by the driver. The obvious drawback of such a device, however, is that it does not respond automatically to the driver's actual level of drowsiness, but requires the driver to estimate his or her own level of drowsiness before setting the alarm.

U.S. Pat. No. 4,617,559 describes an alarm system comprising a pressure control switch for use on a car steering wheel, which activates an alarm when the switch is released. The disadvantage of this device is that the driver is not free to move his or her hands about the circumference of the steering wheel, as when negotiating a turn, without first deliberately deactivating the alarm to prevent it from sounding.

U.S. Pat. No. 5,453,929 describes a driver monitor which varies the operation of the vehicle's information systems in response to physiological variations in the driver. This device lacks the means to detect the level of driver fatigue.

U.S. Pat. No. 5,585,785 discloses an alarm system having a control unit that monitors variable pressure signals from a pressure transducer mounted on a steering wheel. This device is complex and not conducive to after-market installation on different makes and models of automobiles.

Clearly, there remains a need in the art for an inexpensive, simple, and reliable car alarm system that is capable of automatically alerting the driver when he or she has become dangerously fatigued. In addition, there remains a need for a driver fatigue alarm that is unobtrusive, attractive, and convenient to install on various makes and models of automobiles. The present invention, described in detail below, overcomes the disadvantages of the driver alarm systems heretofore disclosed in the art, and also provides additional advantages not afforded by the prior driver alarm systems.

SUMMARY OF THE INVENTION

The present invention provides a driver alarm system which automatically responds to changes in the pressure of the driver's grip on the vehicle steering wheel, alerting the driver with an awakening alarm when the driver grows fatigued and his or her grip on the steering wheel slackens. The invention comprises a flexible, compressible outer jacket which can be mounted on the steering wheel of an automobile or other vehicle. An alarm mechanism, having an electric power source and means to transmit an audible signal to the driver upon the operation of a depressible control switch, is disposed on the inner surface of the jacket. The jacket further contains a pressure transmitting element, which bears upon the depressible control switch to activate the alarm in response to changes in the pressure of the driver's grip on the jacket.

In one embodiment of the invention, the jacket contains a pneumatic or hydraulic transmitting element which disposes the depressible control switch in response to changes in the external pressure exerted on the jacket. When sufficient pressure is exerted on the outside of the jacket, as when the driver is gripping the wheel, pneumatic or hydraulic pressure is brought to bear on the depressible control switch, breaking the circuit between the alarm mechanism and the power source. In this situation, the alarm is deactivated. When the external pressure on the jacket is released, as when the driver's grip loosens due to fatigue, the pressure on the control switch is released, and the circuit between the alarm mechanism and the power source is restored. Thus, a release of pressure on the steering wheel causes the alarm to sound and alert the driver.

In a further embodiment of the invention, the pressure transmitting means comprises a rigid, spring biased element. External pressure on the jacket bears the rigid element against the depressible control switch, breaking the circuit between the alarm mechanism and the power source. Thus, when the driver grips the wheel under normal driving conditions, the alarm is deactivated. A release of pressure on the jacket, as when the driver dozes off, allows the spring biased element to bear away from the depressible control switch, restoring the circuit between the alarm mechanism and the power source.

A further embodiment of the invention comprises a magnetized control switch and an electromagnet. In this embodiment of the invention, the jacket comprises a conductive element surrounded by a compressible conductive foam element. Pressure on the outside jacket, as caused by the grip of the driver, decreases resistance in the center conductor and provides current to the electromagnet, which in turn biases the control switch to deactivate the signaling means. When pressure on the wheel is released, resistance in the center conductor increases and breaks the circuit providing current to the electromagnet. This, in turn, causes the depressible control switch to retract and activate the signaling means.

Accordingly, it is an object of this invention to provide an improved safety alarm system for drivers.

It is also an object of this invention to provide an improved safety alarm for drivers that is inexpensive, reliable, attractive, and convenient.

It is a further object of this invention to provide an improved safety alarm for drivers that automatically alerts drivers to conditions of fatigue and drowsiness.

It is still further an object of this invention to provide an improved safety alarm for drivers that produces an alarm in response to changes in the external pressure on the steering wheel of a vehicle.

These and other objects and advantages of the present invention will become fully apparent from the detailed description below, when taken in conjunction with the annexed drawings.

DESCRIPTION OF THE PREFERRED EMBODIMENTS

Figure 1:
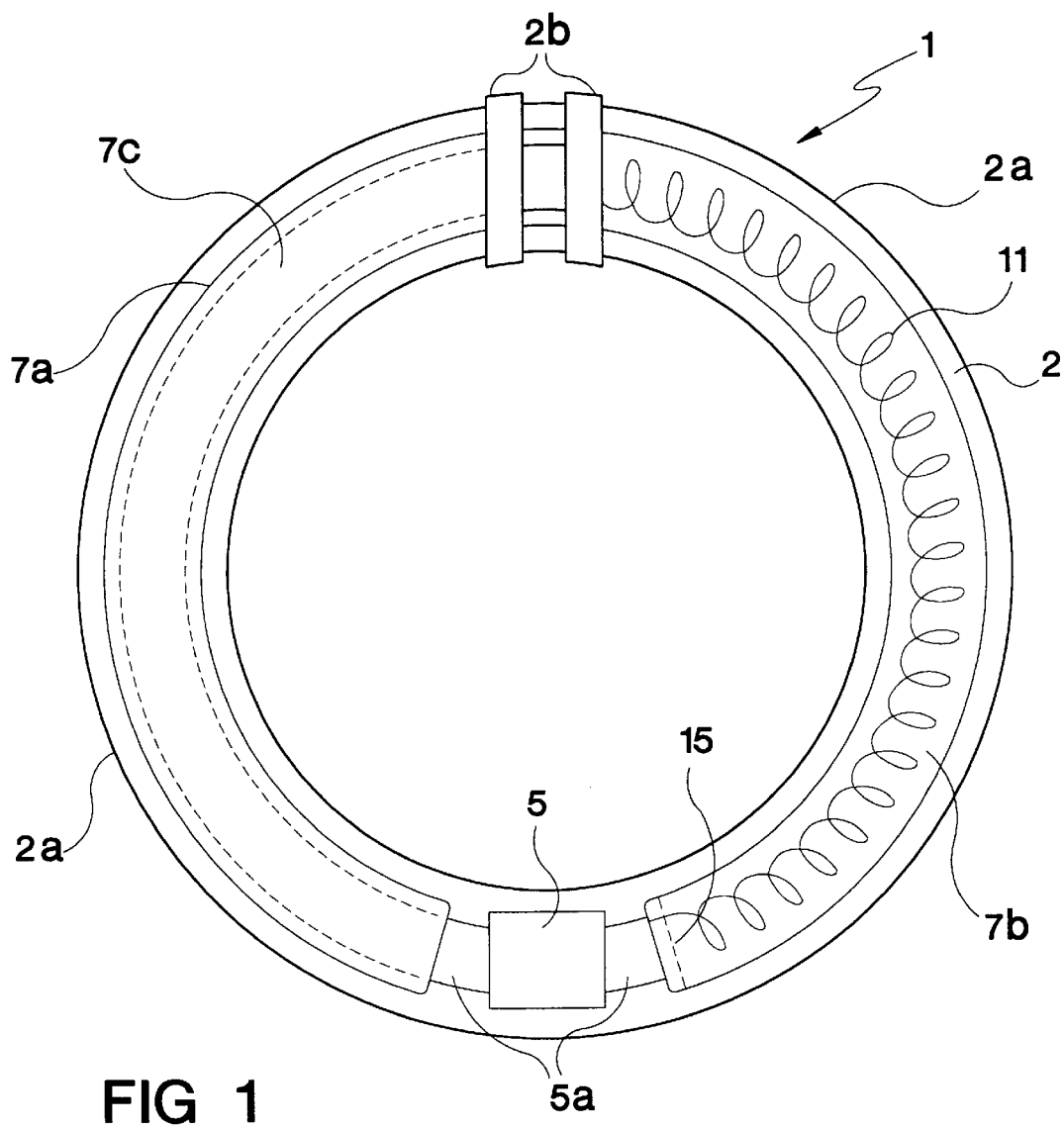
FIG. 1 shows a plan view of the driver alarm system of the present invention as installed on the steering wheel of a vehicle.

Referring now to the drawings in greater detail, the driver alarm system 1 of the present invention is shown in FIG. 1 having a hollow, cylindrical outer jacket 2 pneumatically sealed at either end 2b of opposing semicircular portions 2a, and connected at the ends 2b by any conventional fastener 3. The jacket 2 is preferably constructed of a flexible, resilient material capable of sustaining the small amount of hydraulic or pneumatic pressure required to bear upon the depressible control switch 5, as described below for one embodiment of the present invention. The fastener 3 can be a buckle, snap, or any other convenient means of affixing the ends of the jacket 2b together about the steering wheel of a vehicle. Preferably, the fastener 3 is adjustable to accommodate the dimensions of differently sized steering controls. As stated above any conventional fastener 3 can be used, and therefore, no details of the fastener will be shown or described.

Figure 2:
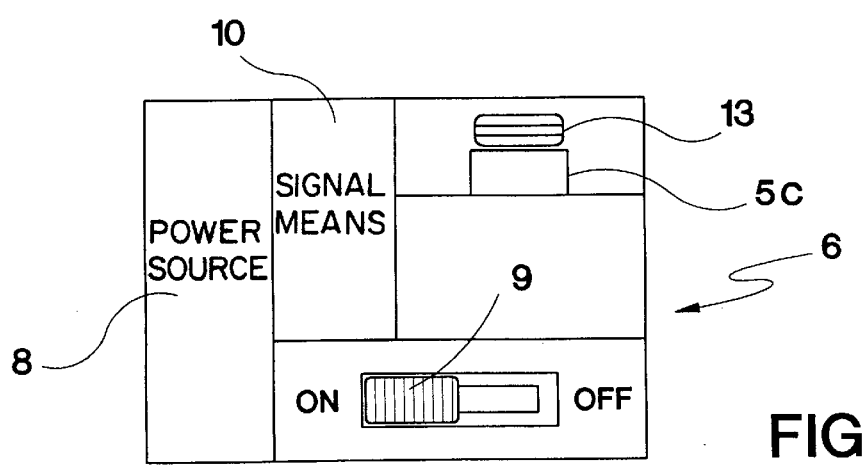
FIG. 2 shows a schematic representation of the alarm mechanism of the present invention.

As further seen in FIG. 1, a depressible control switch 5 is mounted on the inside of the jacket 2. The control switch 5 activates and deactivates the alarm mechanism 6 represented schematically in FIG. 2. As shown in FIG. 2, the alarm mechanism 6 further comprises a power source 8, an on-off switch 9, and an auditory signaling means 10. The power source 8 may consist of a battery or a power cord assembly that is commonly available for use with automobile cigarette lighters. The auditory signaling means 10 may consist of a conventional buzzer, bell, or other common type of alarm.

As shown in FIG. 1, the control switch 5 has opposing, depressible buttons 5a. When the buttons 5a are depressed, the circuit between the power source 8 and auditory signaling means 10 is broken and the alarm signaling means 10 is silent. When the buttons 5a are released, the circuit between the power source 8 and the signaling means 10 is restored, and an alarm is sounded. The jacket 2 further contains rigid, semi-circular members 7a, which provides contact with the buttons 5a to operate the alarm system 6 in the manner described below.

In one embodiment of the invention 1, the jacket 2 is filled with compressed air or fluid, at a pressure slightly insufficient to inwardly dispose the depressible button 5a. Thus, when no external pressure is applied to the jacket 2, the button 5a (shown on the left in FIG. 1) will be in the extended position and the circuit connection between the power source 8 and the signaling means 10 will be restored and the alarm will sound. When pressure is applied, the button 5a will be depressed, which will break the alarm circuit and the signaling means 10 will be silent, provided the power switch 9 is engaged in the "on" position. Rigid member 7a may be hollow as shown at 7c, to form a conduit for the fluid or compressed gas to bear upon the depressible button 5a when external pressure is applied to the jacket 2 which will force the fluid into the hollow conduit 7c of rigid member 7a. External pressure on the flexible jacket 2, such as that imposed by the grip of a driver's hand, brings the hydraulic or pneumatic pressure to bear on the button 5a through the rigid member 7a, thereby compressing the button 5a and disengaging the signaling means 10.

In a further embodiment of the invention 1, compressible member 7b is biased away from the depressible button 5a, to the position shown by the dotted lines 15, by a tension spring 11 extending from the end of member 7b to the element 2b. When no external pressure is applied to the jacket 2, the circuit between the power source 8 and the signaling means 10 is therefore complete and the alarm means 10 will sound. External pressure on the jacket 2, such as that provided by the grip of the driver, overcomes the tension of spring 11 and extends the compressible member 7b from the position shown in dotted lines to the position shown in solid lines, which will push the depressible button 5a, thereby disengaging the signaling means 10.

Figure 3:
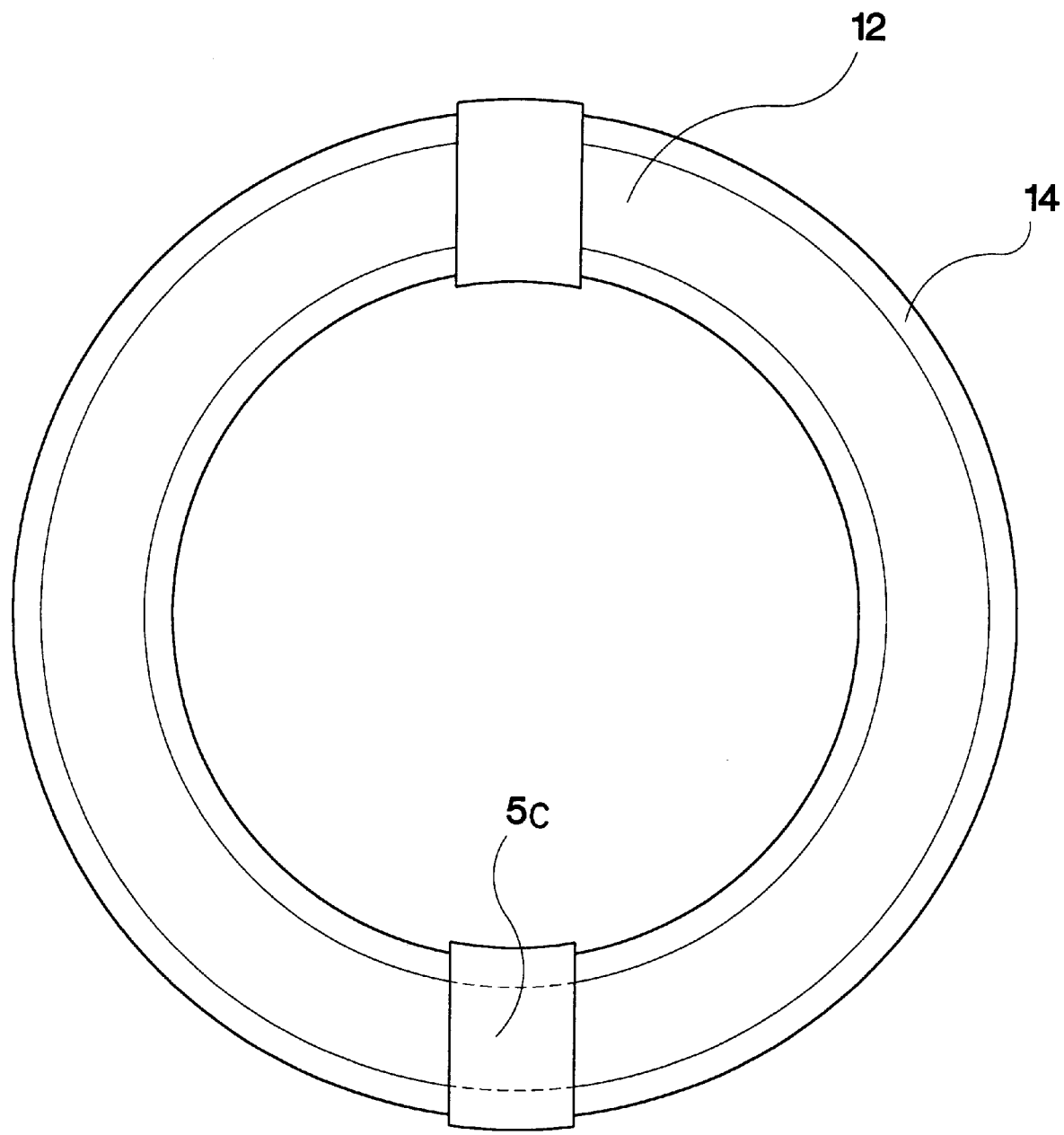
FIG. 3 shows a further embodiment of the driver alarm system of the present invention.

In a further embodiment of the invention 1 shown in FIG. 3, the flexible jacket 2 comprises a center conductor 12 surrounded by a compressible element 14. At resting pressure, i.e., when the driver is not gripping the steering wheel, resistance of the center conductor 12 is at its greatest. Sufficient pressure on the outside jacket 2 expands or elongates the compressible element 14, which elongates or stretches the center conductor 12. This elongation lowers the resistance of the center conductor 12 which closes the circuit and provides current to a coiled electromagnet 13. In this embodiment of the invention 1, the depressible control switch 5 comprises a magnetic button 5c which is biased away or off the electromagnet 13 when the circuit is closed, hence no alarm sounds. When the circuit is broken and magnetic button 5c is disposed toward the electromagnet 13, the signaling means 10 is activated. The magnetic button 5c retracts when resistance in the center conductor is sufficient to cut the current to the electromagnet 13. Signaling means 10 is therefore activated when pressure on the outside jacket 2 decreases and the circuit providing power to the electromagnet 13 is broken.

Thus, it can be appreciated that the driver alarm system 1 of the present invention provides a reliable and convenient device for alerting drivers to conditions of fatigue and drowsiness, by automatically emitting an alarm signal when the driver's grip on the steering wheel grows slack. In use, the driver would activate the driver alarm system I by turning on the "on-off" switch 9 when the driver believes that drowsiness may pose a safety hazard. Once engaged, the driver alarm system1 will respond with an auditory signal when the pressure exerted on the jacket 2 is insufficient to compress the buttons 5a, 5c on the control switch 5 to deactivate the signal.

It may be further appreciated that the driver alarm system 1 of the present invention may be produced in a variety of dimensions for after-market installation on the steering wheels of different makes and models of cars. In the alternative, the driver alarm system 1 of the present invention may be installed at the factory production stage.

In addition, the various embodiments which activate the alarm can be used by themselves, or they may be combined in the same device. For example, as shown in FIG. 1, the tension spring 11 can be used on one side of the steering wheel, and the rigid member 7a can be used on the other side of the steering wheel. Also, the compressible member 14 can be used on both sides of the steering wheel, as shown in FIG. 3, or the compressible member 14 can be substituted for the tension spring 11 or the rigid member 7a shown in FIG. 1.

Also, it should be noted that the alarm 8, 9, 10 could be an integral part of the control switch 5, or it could be a separate part which is mounted in the vehicle at a remote location and connected to the switch 5 by electrical wiring.

Although the driver alarm system and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. An alarm system for providing a warning to a driver of reduced alertness on the part of the driver of a vehicle, said alarm system comprising:

cover means for attaching said alarm system to a steering wheel of a vehicle, said cover means being compressible, alarm means for warning a driver of a vehicle of reduced alertness, contact means connected to said alarm means for turning said alarm on or off, means in said cover means for moving said contact means from a first position to a second position, when said contact means is in said first position, said alarm means is off and no warning will be given, and when said contact means is in said second position, said alarm means is on and a warning will be given, and wherein said means for moving said contact means comprises:

a hollow tube, said hollow tube is positioned adjacent said contact means, means within said hollow tube for moving said contact means from said first position to said second position, and wherein said means within said hollow tube for moving said contact means from said first position to said second position is a liquid.

2. The alarm system as claimed in claim 1, wherein said cover means is a steering wheel cover.

3. An alarm system as claimed in claim 1, wherein said contact means has at least one depressible button, when said depressible button is in an extended position said alarm means is on and when said button is in a depressed position said alarm means is off.

4. An alarm system as claimed in claim 1, wherein said means for moving said contact means is compressible.

5. An alarm system as claimed in claim 1, wherein said means for moving said contact means comprises:

a compressible member, said compressible member is positioned adjacent said contact means, means within said compressible member for holding said compressible member in a first position and when in said first position, said alarm means is on, means for compressing said compressible member and thereby moving said compressible member to a second position and when in said second position, said alarm means is off.

6. An alarm system as claimed in claim 5, wherein said means within said compressible member for holding said compressible member in a first position is a tension spring.

7. An alarm system as claimed in claim 2, wherein said cover has two sides, and the means for moving said contact means comprises:

a hollow tube, said hollow tube is positioned adjacent said contact means, means within said hollow tube for moving said contact means from said first position to said second position, and said hollow tube is mounted in only one of said two sides.

8. An alarm system as claimed in claim 2, wherein said cover has two sides, and the means for moving said contact means comprises:

a hollow tube, said hollow tube is positioned adjacent said contact means, means within said hollow tube for moving said contact means from said first position to said second position, and said hollow tube is mounted in only one of said two sides, and the means for moving said contact means additionally comprises:

a compressible member, said compressible member is mounted in another one of said two sides and is positioned adjacent said contact means, means within said compressible member for holding said compressible member in a first position and when in said first position, said alarm means is on means for compressing said compressible member and thereby moving said compressible member to a second position and when in said second position, said alarm means is off and no warning will be given.

9. An alarm system as claimed in claim 8, wherein said means within said compressible member for holding said compressible member in a first position is a tension spring.

10. An alarm system for providing a warning to a driver of reduced alertness on the part of the driver of a vehicle, said alarm system comprising:

cover means for attaching said alarm system to a steering wheel of a vehicle, said cover means being compressible, alarm means for warning a driver of a vehicle of reduced alertness, contact means connected to said alarm means for turning said alarm on or off, means in said cover means for moving said contact means from a first position to a second position, when said contact means is in said first position, said alarm means is off and no warning will be given, and when said contact means is in said second position, said alarm means is on and a warning will be given, and wherein said means for moving said contact means comprises:

a compressible member, a conductive member within said compressible member, said conductive member having a resistance of a first value when said compressible member is uncompressed and having a resistance of a second value when said compressible member is compressed, said conductive member engaging said contact means, when said compressible member is compressed, said resistance of a second value preventing said alarm means from giving said warning, and when said compressible member is uncompressed, said resistance of a first value enables said alarm means to give said warning.

11. An alarm system for providing a warning to a driver of reduced alertness on the part of the driver of a vehicle, said alarm system comprising:

cover means for attaching said alarm system to a steering wheel of a vehicle, said cover means being compressible, alarm means for warning a driver of a vehicle of reduced alertness, contact means connected to said alarm means for turning said alarm on or off, means in said cover means for moving said contact means from a first position to a second position, when said contact means is in said first position, said alarm means is off and no warning will be given, and when said contact means is in said second position, said alarm means is on and a warning will be given, and wherein said cover means is a steering wheel cover, and wherein said cover has two sides, and the means for moving said contact means comprises:

a hollow tube, said hollow tube is positioned adjacent said contact means, means within said hollow tube for moving said contact means from said first position to said second position, and said hollow tube is mounted in only one of said two sides, and wherein said means within said hollow tube for moving said contact means from said first position to said second position is a liquid.

* * * * *